US009074040B2

(12) United States Patent
Turshani et al.

(10) Patent No.: US 9,074,040 B2
(45) Date of Patent: Jul. 7, 2015

(54) CURABLE ADHESIVE COMPOSITIONS

(75) Inventors: Yassin Turshani, Madeira Beach, FL (US); Omar Mohamed Buazza, Louisville, KY (US); Anita Trajkovska, Christiansburg, VA (US)

(73) Assignee: Mitsui Chemicals, Inc., Tokyo (JP)

( * ) Notice: Subject to any disclaimer, the term of this patent is extended or adjusted under 35 U.S.C. 154(b) by 510 days.

(21) Appl. No.: 13/045,961

(22) Filed: Mar. 11, 2011

(65) Prior Publication Data
US 2012/0154739 A1 Jun. 21, 2012

Related U.S. Application Data

(60) Provisional application No. 61/424,737, filed on Dec. 20, 2010.

(51) Int. Cl.
| | | |
|---|---|---|
| *C08F 2/50* | (2006.01) | |
| *G02C 7/02* | (2006.01) | |
| *C09D 175/16* | (2006.01) | |
| *C08G 71/04* | (2006.01) | |
| *C08L 75/04* | (2006.01) | |
| *C08G 18/76* | (2006.01) | |
| *C08G 18/32* | (2006.01) | |
| *C08G 18/38* | (2006.01) | |
| *C09J 175/16* | (2006.01) | |

(52) U.S. Cl.
CPC ........ *C08G 18/7642* (2013.01); *C08G 18/3243* (2013.01); *C08G 18/3876* (2013.01); *C09J 175/16* (2013.01)

(58) Field of Classification Search
CPC ........ C08F 2/50; G02C 7/022; C09D 175/16; C08G 71/04; C08L 75/04
USPC ............ 351/159.03, 159.39; 522/174, 78, 74; 521/159.03, 159.39
See application file for complete search history.

(56) References Cited

U.S. PATENT DOCUMENTS

| | | | |
|---|---|---|---|
| 4,264,757 A * | 4/1981 | Park ................................. 528/75 | |
| 4,487,904 A | 12/1984 | Fukuda et al. | |
| 4,672,088 A * | 6/1987 | Scott et al. .................... 524/236 | |
| 4,721,377 A | 1/1988 | Fukuda et al. | |
| 4,812,032 A | 3/1989 | Fukuda et al. | |
| 4,954,591 A | 9/1990 | Belmares | |
| 5,040,870 A | 8/1991 | Ohno et al. | |
| 5,116,670 A * | 5/1992 | Suzuki et al. .................. 442/232 | |
| 5,183,831 A | 2/1993 | Bielat et al. | |
| 5,274,067 A * | 12/1993 | Kressdorf et al. ............. 528/75 | |
| 5,366,573 A | 11/1994 | Bayer et al. | |
| 5,426,166 A | 6/1995 | Usifer et al. | |
| 5,484,864 A | 1/1996 | Usifer et al. | |
| 5,566,027 A | 10/1996 | Saitoh et al. | |
| 5,624,759 A | 4/1997 | Usifer et al. | |
| 5,698,285 A | 12/1997 | Kojima | |
| 5,805,358 A | 9/1998 | Yamashita et al. | |
| 5,883,192 A | 3/1999 | Natori et al. | |
| 5,992,314 A | 11/1999 | Lorenz et al. | |
| 6,150,479 A | 11/2000 | Klemarczyk et al. | |
| 6,171,675 B1 | 1/2001 | Iida | |
| 6,242,065 B1 | 6/2001 | Blomberg et al. | |
| 6,337,118 B1 | 1/2002 | Takehana et al. | |
| 6,342,545 B1 | 1/2002 | Klemarczyk et al. | |
| 6,437,069 B1 | 8/2002 | Yokoyama | |
| 6,528,160 B1 | 3/2003 | Takushima | |
| 6,531,180 B1 | 3/2003 | Takushima et al. | |
| 6,570,714 B2 | 5/2003 | Soane et al. | |
| 6,573,348 B2 | 6/2003 | Yokoyama et al. | |
| 6,632,500 B1 | 10/2003 | Takahashi | |
| 6,663,978 B1 | 12/2003 | Olson et al. | |
| 6,760,533 B2 | 7/2004 | Nakamura et al. | |
| 7,074,847 B2 | 7/2006 | Doi et al. | |
| 7,122,253 B2 | 10/2006 | Yamaguchi et al. | |
| 7,307,107 B2 | 12/2007 | Imai et al. | |
| 7,439,278 B2 | 10/2008 | Jallouli | |
| 7,463,417 B2 | 12/2008 | Duncan et al. | |
| 7,556,843 B2 | 7/2009 | Kura et al. | |
| 7,576,167 B2 | 8/2009 | Mori et al. | |
| 7,632,880 B2 | 12/2009 | Li et al. | |
| 2003/0203000 A1 * | 10/2003 | Schwarz et al. ............... | 424/423 |
| 2005/0070634 A1 * | 3/2005 | Lutz et al. ...................... | 523/427 |
| 2005/0209401 A1 * | 9/2005 | Lutz et al. ...................... | 525/113 |
| 2006/0241220 A1 | 10/2006 | Li et al. | |
| 2006/0276601 A1 * | 12/2006 | Lutz et al. ...................... | 525/528 |
| 2008/0009589 A1 * | 1/2008 | Lutz et al. ...................... | 525/459 |
| 2008/0251202 A1 * | 10/2008 | Eagle et al. .................... | 156/330 |
| 2009/0256977 A1 | 10/2009 | Haddock et al. | |
| 2010/0101455 A1 * | 4/2010 | Burckhardt ................ | 106/287.3 |

FOREIGN PATENT DOCUMENTS

| | | |
|---|---|---|
| EP | 1388852 A1 | 11/2004 |
| JP | H10-67970 | 3/1998 |
| JP | 2003-34776 | 2/2003 |

(Continued)

OTHER PUBLICATIONS

Dyakov et al., "Photo-dissociation dynamics of benzoic acid", J. Chem. Phys. 132, 014305 (Jan. 2010).*
U.S. Appl. No. 61/424,737, filed Dec. 20, 2010.
Atsuts et al. "Bonding fixed prosthodontic composite resin and precious metal alloys with the use of vinyl-thiol primer and an adhesive opaque resin" The Journal of Prosthetic Dentistry, Mar. 1992, vol. 67, No. 3, pp. 296-300.
G. G. Khan Malek et al, "Adhesion promotion between poly(methylmethacrylate) and metallic surfaces for LiGA evaluated by shear stress measurements" J. Vac. Sci. Technol. B 16(6), Nov./Dec. 1998, pp. 3543-3546.
Office Action dated Dec. 3, 2013, in Japanese Patent Application No. 2012-504918, mailed Dec. 10, 2013.

(Continued)

*Primary Examiner* — Michael Pepitone
*Assistant Examiner* — Jessica Roswell
(74) *Attorney, Agent, or Firm* — Sterne, Kessler, Goldstein & Fox P.L.L.C.

(57) ABSTRACT

Curable adhesive compositions comprising a urethane prepolymer are provided that exhibit a high refractive index.

15 Claims, No Drawings

(56) References Cited

FOREIGN PATENT DOCUMENTS

| JP | 2003-535921 | 12/2003 |
| JP | 2004-210617 | 7/2004 |
| WO | WO 01/30933 A1 | 5/2001 |
| WO | WO 2004/074884 A1 | 9/2004 |
| WO | WO 2010/118421 | 10/2010 |

OTHER PUBLICATIONS

D. B. Yang et al, "Polarized Grazing Angle FTIR Study of Molecular Orientation and Bonding of Thioglycolates at the Metal Interface" Surf. Interface Analysis, (1996), 24(12), 803-810.

English Language Abstract of Japanese Patent Publication No. 2004-210617, European Patent Office, espacenet database—Worldwide, (2004) (listed as document FP5 on the accompanying form PTO/SB/08A)

English Language Abstract of Japanese Patent Publication No. JP H10-067970, Japanese Patent Office, Patent Abstracts of Japan— (listed as document FP1 on the accompanying form PTO/SB/08A).

H. Rieley et al, "Photo-oxidation and photo-reduction in alkyltmol monolayers self-assembled on gold" J. Chem. Soc., Faraday Trans., 1996, 92(19), pp. 36629-3624.

J. I. Henderson et al, "Self-assembled monolayers of dithiols, diisocyanides, and isocyanothiols on gold: 'chemically sticky' surfaces for covalent attachment of metal clusters and studies of interfacial electron transfer" Inorganica Chimica Acta 242 (1996), pp. 155-124.

J. Tour et al, "Self-Assembled Mono layers and Multilayers of Conjugated Thiols, α, 'ω-Dithiols, and Thioacetyl-Containing Adsorbates. Understanding Attachments between Potential Molecular Wires and Gold Surfaces," J. Am. Chem. Society 1995, 117, pp. 9529-9534.

Kojima et al, "Studies on Adhesion of Functional Monomers with SH Group to Tooth Substrates and Dental Alloys", Div. of Organic Material, Institute for Medical and Dental Engineering, 1986, vol. 5, No. 1, pp. 92-105.

Idacavage, Mike J. "Halogen-Free, UV-Curable High Refractive Index Materials for Light Management." Cytec Industries, Inc. Straregy Technology Group. From Cytec Industrusies, Inc. Georgia Tech Nano@Tech Seminar Series. (2010). Retrieved from Internet on [Sep. 27, 2013]. Retrieved from <URL:https://smartech.gatech.edu/bitstream/handle/1853/35474/>.

M. Glodde et al, "Adhesion promotors for gold: Bis-(ω-aminoalkyl)-disulfides" Journal of Adhesion & Adhesives, 18(1998), pp. 359-364.

R. G. Osifchin et al, "Single Electron Tunneling in Molecular Nanostructures of Single Crystal Gold Clusters Attached by Dithols to Au(111): Direct I(V) Measurements of Individual Surface Attached Gold Clusters by STM" Polym. Mat. Sci. Eng. (1995) 73, pp. 208-209.

R. G. Schmidt et al, "Investigation of Steel/Epoxy Adhesion Durability Using Polymeric Coupling Agents III. Influence of Coupling Agent Layer Thickness" J. Adhesion 1989, vol. 27, pp. 135-142.

R.P. Winkler et al, "New UV-Curable Adhesives with Variable Refractive Index Based on Inorganic-Organic Nanocomposites (NANOMER®) for Optical Components" 9th Cimtec-World Ceramics Congress, pp. 689-696.

T. Koch et al, "UV-Curable Epoxy Based Nanocomposite Adhesive for Applications in Integrated Optics" 9th Cimtec-World Ceramics Congress, pp. 681-688. (1999).

Translation of Office Action dated Dec. 3, 2013, in Japanese Patent Application No. 2012-504918, mailed Dec. 10, 2013.

W. Deng et al, "Multi-Layer Formation of Copper Ions (Cu2+) Deposited onto Self-Assembled Monolayers of Alkanedithiols on Au (111) Surfaces," Jpn. J. Appl. Phys. vol. 39 (2000) pp. L751-L754.

W. Huang et al, "Surface-Initiated Thermal Radical Polymerization on Gold" American Chemical Society, Langmuir 2001, 17, pp. 1731-1736.

\* cited by examiner

CURABLE ADHESIVE COMPOSITIONS

CROSS REFERENCE TO RELATED APPLICATIONS

This application claims the benefit of U.S. Provisional Application No. 61/424,737 filed Dec. 20, 2010, which is incorporated herein in its entirety.

FIELD OF THE INVENTION

The present invention relates to curable laminating adhesives.

BACKGROUND OF THE INVENTION

Adhesives have been widely used in various industries for many years, and numerous adhesives are commercially available. But finding a suitable commercially available adhesive to meet certain requirements is not always possible. In some cases, a suitable adhesive can be designed to meet particular specifications, and can take advantage of the availability of new monomers, additives, curing agents and new advanced in polymer processing technology.

Curable adhesives are well known. These include adhesives that are curable by radiation generally, as well as those that are curable by ultraviolet or visible light in particular. Unfortunately, known curable adhesives may suffer from a number of disadvantages. For example, many adhesives suffer from insufficient adhesion and/or inappropriate refractive index to match the refractive indices of the intended substrates. Many adhesives have a refractive index (RI) that is lower than 1.60, which is not suitable for lenses (e.g., electroactive lenses or composite lenses) made of plastic materials having an RI of 1.67 or higher. While there are a few adhesive compositions with high RI, they suffer from poor adhesion, unsuitable viscosity, or poor batch life. Some adhesives also require the use of solvents that must be evaporated during curing, and thus are not suitable for one or more electro-active assembly processes.

A need therefore exists for curable adhesives, especially UV curable adhesives, that exhibit a high RI, and preferably improved adhesion and viscosity.

BRIEF SUMMARY OF THE INVENTION

The invention provides an adhesive composition having a high refractive index, e.g., greater than or equal to 1.60 (e.g., about 1.60 to about 1.74), good adhesion, viscosity, and viscosity stability, and a device, comprising a first ophthalmic component and a second ophthalmic component with the curable adhesive composition disposed between the first and second ophthalmic components. The invention may be implemented in a number of ways.

According to one aspect of the invention, the curable adhesive composition comprises a urethane pre-polymer comprising an isocyanate (e.g., difunctional isocyanate) and an allylic phenol, and a photoinitiator. The adhesive composition has a refractive index, after curing, of greater than 1.60, and the viscosity of the adhesive increases by less than 100% over about 8 hours. In one embodiment, the adhesive composition, after curing, has a refractive index of about 1.60 to about 1.74. In another embodiment, the viscosity of the adhesive increases by less than 100% over about 24 hours. The adhesive composition may be curable by ultraviolet radiation.

In one aspect, the difunctional isocyanate component of the urethane pre-polymer is m-xylene diisocyanate. In another aspect, the allylic phenol component of the urethane pre-polymer is diallylether bisphenol A or ortho-diallyl bisphenol A. Preferably, the urethane pre-polymer comprises xylene diisocyanate and ortho-diallyl bisphenol A.

In one aspect, the adhesive composition comprises about 5 to about 30 wt % of at least one urethane pre-polymer, and about 0.01 wt % to about 5 wt % of at least one photoinitiator.

The adhesive composition may further comprise a stabilizer, such as one or more nitrosamine components.

The adhesive composition may further comprise a thiol component. In some embodiments, the thiol component is 1,2-bis(2-mercapto ethylthio)-3-mercapto propane or trimethylolpropane tris(3-mercaptopropionate). The viscosity of the composition may not change by more than 1000 cP after the thiol component comes into contact with the urethane pre-polymer.

The adhesive composition may further comprise at least one acrylate, such as NK A-BPEF and/or BX-PTEA.

The adhesive composition may further comprise at least one vinyl resin, such as NTT #6205. In some embodiments, the adhesive composition further comprises about 20 wt % to about 25 wt % of at least one vinyl resin.

The adhesive composition may further comprise at least one naphthalene component. In a preferred embodiment, the naphthalene component is 1-bromo naphthalene.

According to another aspect of the invention, a device comprising a first ophthalmic component, a second ophthalmic component, and a curable adhesive composition disposed between the first and second ophthalmic components is provided. The adhesive composition comprises at least one urethane pre-polymer and a photoinitiator. The refractive index of the adhesive composition, after curing, is about equal to the refractive index of at least one of the first ophthalmic component and the second ophthalmic component, between the refractive index of the first lens and the refractive index of the second lens, or about equal to the average refractive index of the first ophthalmic component and the second ophthalmic component. In a preferred embodiment, at least one of the first ophthalmic component and the second ophthalmic component has a refractive index of about 1.67±0.07.

Additional features, advantages, and embodiments of the invention may be set forth or apparent from the following detailed description and claims. Moreover, both the foregoing summary of the invention and the following detailed description are exemplary and intended to provide further explanation without limiting the scope of the invention as claimed.

DETAILED DESCRIPTION OF THE INVENTION

In one embodiment, curable adhesive compositions are provided that exhibit a high refractive index, acceptable viscosity, and/or acceptable adhesion. Devices are also provided that include the adhesive composition disposed between two substrates.

An exemplary assembly process for fabricating electro-active lenses is described in U.S. Publication 2009/0256977, which is hereby incorporated by reference in its entirety. A portion of the assembly process can include two preformed plastic lenses, one of which has a lens surface comprising a diffractive pattern filled with electro-active material (i.e., liquid crystal), that are subsequently bonded together. Because of the diffractive pattern, the laminate surfaces can generate a thin cavity (e.g., in the range of 30-70 microns thick). The thickness of this cavity can depend on the diffractive design.

Refractive Index

In one embodiment, the UV curable adhesive composition has a refractive index (RI) that matches the RI of the preformed lenses. If the two preformed lenses have different RIs, the value of RI of the adhesive composition can be between (e.g., an average of) the two RIs of the preformed lenses to reduce or eliminate light interference due to the difference in RI of the two preformed lenses. The compositions may be suitable for adhering a wide variety of lens materials, including electro-active lenses and composite lenses. The adhesives are particularly suitable for use with plastic materials having an RI of about 1.67 or higher. For example, the adhesives may be used to laminate MR-10 (RI 1.67). The laminated substrates may be the same as, or different from, one another.

Unless otherwise specified, the refractive index of the adhesive composition is reported after curing at 25° C. (Curing increases the RI of the adhesive composition by about 0.01-0.05, more specifically about 0.03.) In contrast, unless otherwise specified, the RI of the individual components of the adhesive are reported before curing at 25° C.

The adhesive compositions provided herein have a refractive index of at least 1.60, 1.63, 1.65, 1.67, or 1.70. The adhesive compositions described herein are categorized as high index, which has a refractive index of about 1.6 to about 1.74.

Viscosity

Viscosity of an adhesive composition is an important parameter that affects manufacturing. Viscosity is not a predictable feature of a composition; it can not be calculated strictly by weight average. For example, although adding a low viscosity component to a composition will dilute the viscosity of the composition, the precise reduction in viscosity cannot be predicted based on the amount, e.g., percent weight, and viscosity of the individual component added. Accordingly, achieving an acceptable viscosity of the adhesive composition requires an understanding of the manufacturing process to be employed as well as the balancing of the various adhesive components as taught herein.

Accordingly, the curable adhesive can have a predetermined or desired viscosity value to flush away the excess liquid crystal that may overflow into the cavity during the assembly process. As an example, compositions with viscosity of about 100 cP or less may break the diffractive seal during the filling process and consequently could contaminate the electro-active material inside the diffractive pattern. However, low viscosity adhesive compositions may be suitable to laminate two preformed lenses that do not comprise diffractive patterns. In some embodiments, the viscosity of the adhesive composition, before curing, is about 500 to about 10000 cP, about 1000 to about 5000 cP, about 1000 cP to about 3000 cP, or about 1000 to about 2000 cP. Preferably, the viscosity of the adhesive composition, before curing, is about 1000 to about 2000 cP.

Viscosity stability is another important parameter that affects the manufacturing process. The viscosity stability is a measure of the time over which the stability of the adhesive composition remains substantially constant. Contacting the acrylate component and/or urethane pre-polymer component with the thiol component is "time zero" on the timeline for viscosity stability. In other words, the viscosity of the adhesive composition begins to change starting at the time when the acrylate component and/or urethane pre-polymer component contacts the thiol component. The thiol catalyzes polymerization of the acrylate, which triggers a change in the viscosity of the adhesive composition.

The components of the adhesive composition can be isolated into two or more premixes, which are mixed together to form the final adhesive composition. In particular, the thiol component and the acrylate component of the final adhesive composition may each be contained in a separate premix, such that they do not contact one another until the two separate premixes are mixed together to form the final adhesive composition. Additional components of the final adhesive composition, e.g., vinyl resin or naphthalene, may be isolated in either premix.

For example, the components of the adhesive composition can be isolated into two or more pre-mixes, i.e., premix A and premix B, which are mixed together to form the final adhesive composition. Premix A may contain the acrylate and the urethane pre-polymer, while premix B may contain the thiol. In some embodiments, premix A contains most of the components and premix B contains only the thiol component.

The adhesive should not come in contact with the electro-active material while laminating two preformed plastic lenses. An adhesive composition that maintains approximately the same viscosity over time may be useful for preventing contamination of the liquid crystal material used in the electro-active lenses.

Additionally, large changes in the viscosity of the adhesive composition over time may require adjusting the dispensing process, which can delay production time and increase cost. Therefore, adhesive compositions with good viscosity stability may ensure that the manufacturing process is consistent.

Changes in the viscosity of the adhesive composition over time may also pose technical risks. Therefore, it is generally desirable for the viscosity of the adhesive to remain constant over time. For example, the viscosity of the adhesive composition should not substantially change during the period of daily production use. By maintaining viscosity stability, it is easier to transport the adhesive composition in a more stable fashion, or transport the composition as two separate premixes. Maintaining viscosity stability also enables shift workers to use the same batch of adhesive over an entire shift, which promotes consistent manufacturing and device properties. In addition, viscosity stability can prevent wasted time spent mixing a new batch of adhesive, thereby promoting more efficient manufacturing processes.

In some embodiments, the viscosity of the adhesive should remain substantially stable for at least 0.5 hours, at least 1 hour, at least 7 hours, at least 8 hours, at least 10 hours, at least 12 hours, at least 16 hours, at least 20 hours or at least 24 hours. Preferably, the viscosity of the adhesive composition should remain stable for at least 8 hours. The time frame for measuring viscosity stability can be started at, e.g., "time zero." In this way, the viscosity of the adhesive composition remains substantially stable through the stages of the composition's lifetime, e.g., processing, storage, shipment, use, and aging. For example, an adhesive with good viscosity stability will have minimal or no gel formation and/or skin formation.

In some embodiments, remaining "substantially stable" is assessed as the change in viscosity over a time. In one embodiment, the viscosity of the adhesive does not change by more than 500 cP, more than 1000 cP, more than 2000 cP, more than 3500 cP, or more than 5000 cP from "time zero" over a time period as described above. Preferably, the viscosity of the adhesive should not change by more than 1000 cP. For example, if the adhesive has a starting viscosity of about 2000 cP, then the viscosity should not exceed 3000 cP.

In further embodiments the viscosity of the adhesive over time should increase by less than 50%, less than 100%, less than 150%, or less than 200%. Preferably, the viscosity of the adhesive over time should increase by less than 100%. In one embodiment, the viscosity of the adhesive should less than double after the thiol component contacts the acrylate component, e.g., after mixing premix A and premix B.

Adhesion

Adhesion performance is also a high priority. For a strong, durable bond, the adhesive compositions can be designed to avoid frozen-in stresses and voids, which can be caused by adhesive shrinkage. In general, the lower the shrinkage rate, the better the adhesion. To reduce shrinkage rate, the adhesive can comprise monomers with a lower number of reactive functional groups, or they can comprise high molecular weight oligomers or pre-polymers. It is desired for the adhesive composition to be able to wet and spread on a substrate surface. This molecular-level contact allows the forces of adhesion to develop, removes entrapped air from the interface, and maximize the area over which bond can develop. For a clean, smooth substrate, wetting and spreading is governed by the surface tensions of the two materials. The lower the surface tension of the adhesive, the better the wetting. Aside from surface tension, surface preparation, especially of plastic substrates, is an important step to improve adhesion performance. Methods such as chemical etching and plasma can be used to improve the adhesion performance of the adhesive compositions. Another efficient method to improve adhesion performance of the adhesive compositions is to treat the surface with functionalized alkoxysilanes, such as acryloxy trimethoxy silane.

The adhesive compositions described herein can be formed as blends of urethane pre-polymers, photoinitiator(s), vinyl resins, acrylates, thiols, and additional components. In particular, the adhesive compositions contain a urethane pre-polymer and a photoinitiator.

Urethane Pre-Polymer

The adhesive compositions provided herein contain a urethane pre-polymer comprising an isocyanate (e.g., a difunctional isocyanate) and an allylic phenol. Without being bound by theory, the urethane pre-polymer may increase viscosity stability and also improve the adhesion performance of the adhesive. In one embodiment, the adhesive compositions provided comprise about 5-30% of the urethane pre-polymer. If the amount of urethane pre-polymer in the composition is less than about 5%, then it is thought that the adhesive composition will have low viscosity. Alternatively, if the amount of urethane pre-polymer in the composition is greater than about 30%, it is thought that the refractive index is reduced, and the viscosity is increased. The urethan pre-polymer can be synthesized according to the methods described in Examples 1 and 2, and using the components as described below.

Suitable isocyanates for the urethane pre-polymer can selected from, organic diisocyanates represented by the formula, $R(NCO)_2$, in which R is a divalent aliphatic, cycloaliphatic, or aromatic hydrocarbon group. Preferably R is an aromatic group. Polyisocyanates containing three or more isocyanate groups may also can be used. Exemplary isocyanates suitable for use in the urethane pre-polymer include, but are not limited to, xylene diisocyanates (e.g., m-xylene isocyanate), toluene diisocyanate (TDI), diphenylmethane diisocyanate (MDI), 1,4-tetramethylene diisocyante, 1,6-hexamethylene diisocyanate, 2,2,4-trimethyl-1,6-hexamethylene diisocyanate, cyclohexane-1, 3 or 1,4-diisocyanate, 1-isocyanato-3-isocyanatemethyl-3,5,5-trimethyl-cyclohexane, and 4,4',4"-triphenylmethane triisocyante. Preferably, the difunctional isocyanate component of the pre-polymer is xylene diisocyanate. Without being bound by theory, it is believed that the isocyanate component of the urethane pre-polymer may improve adhesion performance because isocynates are used to produce polyurethanes, which demonstrate good adhesion properties.

The composition may contain a bisphenol A as the allylic phenol of the urethane pre-polymer. The bisphenol A component(s) can be present in an amount of, e.g., about 1 to about 70%, about 5 to about 25%, or about 30 to about 60%. Without being bound by theory, it is believed that the bisphenol A improves the mechanical properties of the adhesive composition by, e.g., preventing film breakdown. Exemplary bisphenol A components include, but are not limited to, ethoxylated (10) bisphenol A diacrylate, ethoxylated (4) bisphenol A diacrylate, ethoxylated (4) bisphenol A dimethacrylate, diallylether bisphenol A, and ortho diallyl bisphenol A.

The allylic phenol of the urethane pre-polymer can be, e.g., diallylether bisphenol A or ortho diallyl bisphenol A. In one embodiment, the allylic phenol is ortho diallyl bisphenol A, which has a structure as follows:

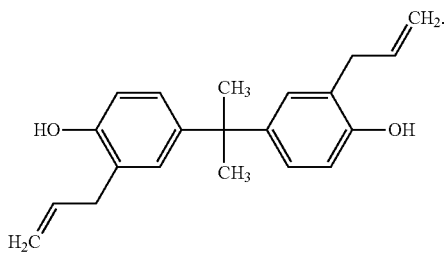

The optional bisphenol A acrylate component of some adhesive compositions differs from the ortho allyl bisphenol A used to make the urethane pre-polymer. Ortho allyl bisphenol A has free hydroxyl functional groups that ca react with isocynate to form the urethane pre-polymer. Unlike ortho allyl bisphenol A, bisphenol A acrylate does not have free hydroxyl groups as shown in the structure of bisphenol A acrylate below.

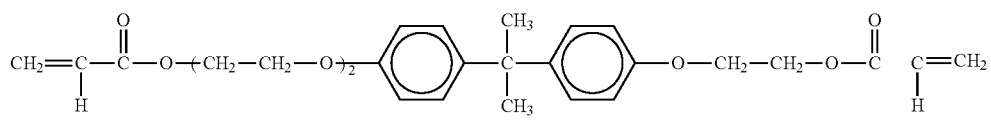

Without being bound by theory, it is believed that the phenol moiety of the allylic phenol may reduce and/or prevent room temperature polymerization of the thiol-ene reaction by acting as an inhibitor or free radical scavenger, thereby providing a stable adhesive composition. The allylic phenol has available hydroxyl group(s) to react with the isocyanate to make the urethane pre-polymer. Excess allylic phenols present in the reaction provide UV reactive sites that polymerize during the UV curing process. It is thought that the allylic moiety of the allylic phenol may polymerize during the UV curing process, such that it becomes part of the final polymer film.

In some embodiments of the urethane pre-polymer, the number of moles of the allylic phenol may be at least twice the number of moles of the difunctional isocyanate. Preferably, the urethane pre-polymer comprises xylene diisocyanate and ortho diallyl bisphenol A in a ratio of about 2:1 to about 10:1, or about 4:1 to about 8:1. In one embodiment, the ratio is about 2:1, about 4:1, or about 8:1.

Photoinitiators

The adhesive compositions provided herein comprise a photoinitiator. The photoinitiator absorbs light and is responsible for the production of free radicals in a free radical polymerized system or cations in a cationic photoinitiated system. There are many photoinitiators commercially available, and a suitable photoinitiator can be selected by considering the following factors:

1) The types of base resin employed: Free radical polymerized resin or cationic polymerized resin.

2) The radiation source: The absorption bands of the photoinitiators should generally substantially overlap the emission spectra of the light source.

3) The absorption bands of the lens laminate: The adhesive can be used to bond two substrates, e.g., preformed transparent plastic lenses. One or both substrates may block UV block light (a common practice for eye protection from sunlight). In this case, the absorption band of the photoinitiator can be outside the absorption band of the substrates.

The photoinitiator concentration can be about 0.01 to about 10%, about 0.01 to about 5%, about 0.1 to about 3%, about 0.1 to about 1.5%, or about 0.1 to about 0.5%. Preferably, the photoinitiator concentration is about 0.1 to about 0.5%, or about 0.2 to about 0.3%.

Preferred components of the photoinitiator system include one or more of:

Phenyl bis(2,4,6-trimethyl benzoyl) phosphine oxide (Irgacure 819),

1-Hydroxy cyclohexyl phenyl-ketone (Irgacure 184),

2-Hydroxy 2-methyl 1-phenyl 1-propane (Daracure 1173),

Triaryl sulfonium salt hexafluoroantimonate and triaryl sulfonium hexafluorophosphate (Cyracure® UVI-6976).

In some embodiments, the photoinitiator is phenyl bis(2, 4,6-trimethyl benzoyl) phosphine oxide (Irgacure 819). Preferably, the adhesive composition comprises about 0.01 to about 5%, or about 0.2 to about 0.3% of Irgacure 819.

The photoinitiator may include a radical photoinitiator, a cationic photoinitiator, or an anionic photoinitiator.

Radical photoinitiator include, but are not limited to, bis (2,3,6-trimethlbenzoyl)-phenylphosphineoxide, 1-hydroxcyclohexylphenylketone, 2-hydroxy-2-methyl-1-phenyl-propan-1-one, bis(2,6-dimethoxybezoyl)-2,4,4-trimethylpentyl phosphe-ine oxide, 2,4,6-trimethylbezoyldiphenylphosphine, 2,2-dimethoxy-2-phenylacetophenone, 4-(2-hydroxyethoxy)phenyl-(2-hydroxy-2-methlpropyl)ketone, 2-methyl thioxanthone, 2-isopropyl thioxanthone, 2-chloro thioxanthone, thioxanthone, xanthene, bezophenoe, 2-methyl-1-[4-methylthio) phenyl]-2-morpholino propan-1-one, and 2-benzyl-2-N,N-dimethlamino-1-(-morpholinophenyl)-1-butanone.

Preferred exemplary radical photoinitiators include bis(2,3, 6-trimethlbenzoyl)-phenylphosphineoxide, 1-hydroxcyclohexylphenylketone, and 2-hydroxy-2-methyl-1-phenyl-propan-1-one.

Cationic photoinitiators include, but are not limited to, triaryl sulfonium salt hexafluoroantimonate; triaryl sulfonium hexafluorophosphate, bis(4-diphenylsulfonio)-phenyl] sufid-bis-hexafluorophosphate, di(alkylphenyl) iodonium salt, diaryl iodonium hexafluoroantimonate, and iron-arene complex.

Anionic photoinitiators include, but are not limited to, O-nitrobenzyl derivatives, metal amine complexes, (cyclopentadienyl) ruthenium complexes, and (cyclopentadienyl) osmium complexes.

In one embodiment, the photoinitiator system includes at least one additive such as a co-catalyst, a phosphine, and/or an amine. Exemplary additives include, but are not limited to, phosphonium salts, tera alkylphosphonium bromide, tera alkylphosphonium chloride, triphenyl phosphine, trimethoxy phenyl phosphine, trichloro phenyl phosphine, alkyl amine primary, dialkyl amine, and trialkyamine.

Vinyl Resins

The adhesive compositions provided herein may comprise at least one vinyl resin. Without being bound by theory, it is believed that the vinyl resin advantageously exhibits a lower viscosity to dilute the high index-high viscosity acrylate component while simultaneously improving adhesion. The vinyl resin(s) can be present in an amount of, e.g., about 0 to about 60%, about 5 to about 60%, about 20 to about 60%, about 30 to about 60%, about 0 to about 40%, about 5 to about 40%, about 5 to about 20%, or about 15 to about 20%. Preferably, the vinyl resin is present in an amount of about 15 to about 20%.

In some embodiment, the adhesive composition comprises at least one high refractive index vinyl resin selected from the group consisting of #6205, #8322, and #8323 (NTT Advanced Technology Corp.). #6205 has a refractive index of 1.68 and a viscosity of 18. In one embodiment, the vinyl resin is #6205 or #8323. Preferably, the vinyl resin is #6205.

Acrylate Monomers and Oligomers, Including High Index-High Viscosity Acrylates

The adhesive compositions provided herein may comprise at least one acrylate monomer and/or oligomer. Without being bound by theory, it is believed that the acrylic component improves adhesion. Moreover, some acrylic components may also advantageously contribute to the high refractive index of the final composition. For example, aromatic acrylates, and particularly halogenated aromatic acrylates exhibit high RI.

An acrylic component (or a combination of acrylic components) can be present in an amount of, e.g., about 0 to about 90%, about 0 to about 70%, about 10 to about 70%, about 20 to about 70%, about 30 to about 70%, about 10 to about 50%, about 20 to about 50%, about 20 to about 40%, about 5 to about 40%, about 10 to about 20%, about 0 to about 20%, or about 0 to about 10%. Preferably, the acrylic component is present in an amount of about 20 to about 50%, about 3 to about 30%, or about 10 to about 30%.

Exemplary acrylate monomers and oligomers that may be suitable for use in the adhesive compositions include, but are not limited to, acrylic oligomer (CN131 B), epoxy acrylate oligomer (CN110), epoxy methacrylate (CN151), ethoxylated (3)-bisphenol A diacrylate (SR349), ethoxylated (2) bisphenol A dimethacrylate (SR348), ethoxylated (4) trimethylolpropane triacrylate, ethoxylated (4) bisphenol A diacrylate (SR601), 2-Phenoxyethyl acrylate (SR339), alkoxylated phenol acrylate (D9088), alkoxylated phenol diacrylate, ethoxylated (2) bisphenol A dimethacrylate SR101, ethoxylated (6) bisphenol A dimethacrylate (SR504), alkoxylated phenol acrylate (SR614), ethoxylated (6) trimethylolpropane triacrylate (SR499), alkoxylated aliphatic diacrylate (SR9209), polyethylene glycol (200) diacrylate, polyethylene glycol(400)diacrylate (SR344), 1,6 hexanediol diacrylate (SR239), tetrahydrofurfuryl acrylate (SR285), isobornyl acrylate (SR506A), tetrahydrofurfuryl methacrylate (SR203), ethoxylated (10) bisphenol A diacrylate (SR602) (Sartomer), 2(2-ethoxyethoxy) ethyl acrylate, 2 hydroxyethyl acrylate, glycidyl methacrylate, phenylthioethylacrylate, alkoxylated nonylphenol acrylate, polyethylene glycol 0-phenyl phenyl ether acrylate (NKE-10), urethane acrylate, alipathic urethane acrylate, brominated aromatic urethane acrylate (CN-2600) (Sartomer), ethoxlyated tribromo phenyl acrylate, tribromophenol acrylate (Kowa American Corp.), 9,9-bis{4-(2-acryloyloxy-ethoxy)phenyl} fluorine (NK A-BPEF), Doublemer R1610 (Innovadex), and BX-PTEA. In one embodiment, the acrylic component includes at least one of NK A-BPEF, NKE 10, BR30, CN-2600, CN131B, tribromophenol acrylate, Doublemer R1610, and BX-PTEA. Preferably, the acrylic component includes at least one of NK A-BPEF, CN 131B, tribromophenol acrylate, and BX-PTEA.

Particular acrylates are high index-high viscosity acrylates having a refractive index, before curing, of at least 1.56 at 25° C., and a viscosity, before curing, of at least 15,000 cP at 25° C. In one embodiment, the curable adhesive composition contains at least one high index-high viscosity acrylate. In some embodiments, the high index-high viscosity component has a refractive index of at least about 1.58, 1.60, or 1.62. In other embodiments, the high index-high viscosity component has a viscosity of at least about 20,000, 40,000, 60,000, 70,000, 80,000, or 90,000 cP at 25° C.

Exemplary high index-high viscosity acrylates include, but are not limited to, aromatic urethane acrylates (e.g., brominated aromatic urethane acrylate), tribromophenyl acrylate, or 9,9-bis{4-(2-acryloyloxyethoxy)phenyl} fluorine (NK A-BPEF). NK A-BPEF has a refractive index of 1.621 and a viscosity of 91,000 at 60° C. Preferably, the high index-high viscosity acrylate is NK A-BPEF.

A high index-high viscosity acrylate (or a combination of more than one high index-high viscosity acrylates) can be present in an amount of about 0 to about 70%, about 10 to about 50%, or about 10 to about 30%. Preferably, the high index-high viscosity acrylate is present in an amount of about 10 to about 30%.

Thiol Component

In some embodiments, the composition contains at least one thiol component. Without being bound by theory, it is thought that a thiol component, e.g., a multifunctional thiol resin, provides high RI and desirable mechanical properties that improve adhesion. Exemplary thiol components include, but are not limited to, 2-bis(2-mercapto ethylthio)-3-mercapto propane, trimethylolpropane tris(3-mercaptopropionate), 2-mercaptoethylthio-3-propanthiol sulfide, pentaerythritol tetrakis(2-mercaptopropoinate), 2,2'-thiodiethanethiol, trimethyloltris(3-mercaptopropoinate) oethylthio-3 propanthiol sulfide, 2,5-dimercaptomethyl-1,4-dithiane, 4,5-(mercaptomethylthio)-1,3-dithiolane, 4,6-(mercaptomethylthio)-1,3-dithiane, 1,1,3,3-tetra (mercaptomethylthio)propane, 1,2-bis(2-mercaptoethylthio)-3-mercaptopropane, 2-mercaptoethyl sulfide (Mitsui Chemicals), 2,3-episulfide propanyl disulfide, 2,3-episulfide propanyl sulfide (supplied by MGC), and 2,3-mercapto propane.

1,2-bis(2-mercapto ethylthio)-3-mercapto propane has a refractive index of 1.633 and a viscosity of 70. Trimethylolpropane tris(3-mercaptopropionate) has a refractive index of 1.523; 1.517 and a viscosity of 67; 190.

In some embodiments, the thiol components is selected from the group consisting of 1,2-bis(2-mercapto ethylthio)-3-mercapto propane, trimethylolpropane tris(3-mercaptopropionate), 2-mercaptoethylthio-3-propanthiol sulfide, pentaerythritol tetrakis(2-mercaptopropoinate), 2,2'-thiodiethanethiol, 2,5-dimercaptomethyl-1,4-dithiane, and 2,3-mercapto propane. Preferably, the thiol components is selected from the group consisting of 1,2-bis(2-mercapto ethylthio)-3-mercapto propane and trimethylolpropane tris(3-mercaptopropionate).

The thiol component(s) can be present in an amount of, e.g., about 0 to about 70%, about 0 to about 50%, about 10 to about 50%, about 10 to about 40%, about 0 to about 30%, about 10 to about 30%, or about 30 to about 40%. Preferably, the thiol component is present in an amount of about 30 to about 40%.

Additional Adhesive Components

The adhesive composition may further contain up to about 10% of a partially or fully hydrolyzed silane coupling agent as an adhesion promoter/coupling agent. Exemplary silanes include, but are not limited to, 3-Methacryloxypropyl trimethoxysilane, 3-Amino-propyl trimethoxysilane, and 3-Glycidoxypropyltrimethoxysilane.

The composition may contain at least one naphthalene component. Without being bound by theory, it is believed that the naphthalene component exhibits a relatively high refractive index (though not typically as high as the high index-high viscosity component) while exhibiting a lower viscosity to balance the high index-high viscosity component. Exemplary naphthalene components include, but are not limited to, 1-vinyl Naphthalene, 2-vinyl Naphthalene, N-vinyl carbazole (Sigma-Aldrich), 1-chloro naphthalene, 1-bromo naphthalene, and 1-naphthaldehyde. In one embodiment, the adhesive composition may contain 1-bromo naphthalene, 1-chloro naphthalene, or 1-naphthaldehyde. Preferably, the naphthalene component is 1-bromo naphthalene. 1-bromo naphthalene has a refractive index of 1.656 and a viscosity of <10. The naphthalene component(s) can be present in an amount of, e.g., about 0.01 to about 40%, about 1 to about 40%, about 5 to about 40%, about 5 to about 20%, about 0.01 to about 10%, about 0.5 to about 5%, or about 1 to about 3%. Preferably, the naphthalene component is present in an amount of about 1 to about 3%.

The composition may contain at least one epoxy resin. Exemplary epoxy resins include, but are not limited to, poly [(phenyl glycidyl ether)-co-formaldehyde]oligomeric epoxide and epoxy acrylates.

The composition may contain at least one of divinyl benzene, 2,6-diphenyl-1,4-phenylene oxide, diphenyl methane bis(4-phenyl)carbamate, alpha-nephthyl methacrylate, alpha-naphthyl, carbonyl methacrylate, beta-naphthyl methacrylate, and styrene sulfide (Scientific Polymer Products, Inc.).

The composition may contain at least one stabilizer, such as a thermal polymerization stabilizer or other convention polymerization inhibitor. Exemplary stabilizers include, but are not limited to, quinines, hydroquinones, nitrosoamines (e.g., nitrosoamine Q-1301, nitrosoamine Q-1300), 2-allyl phenol, and 4-methoxy phenol (MEHQ). Preferably, the stabilizer is N-Nitroso-N-phenylhydroxylamine[aluminum salt) and/or and N-Nitroso-N-phenylhydroxylamine [ammonium salt]. Such stabilizers may extend the viscosity stability of the adhesive to greater than 24 hours and up to several days. Unlike the reactive phenols in the urethane pre-polymer, nitrosoamines are commercially available and sold as salts, which require aggressive solvents, which may alter the film mechanical properties and reduce the RI. Therefore, the concentration of nitrosoamine should not exceed 5%. Preferably, the concentration of nitrosamines is about 0.01 to about 3%.

In some cases, particular components may be preferred depending on the desired refractive index outcome. To that end, preferred components for high index adhesives are provided. Numerous high index adhesive compositions are also provided in the Examples.

Unless otherwise specified, component amounts, here and throughout the specification, are provided as weight percents of the total composition.

Exemplary Formulations

The adhesive composition can be selected to match the average refractive index of the cured composition and the substrates. In the case of laminating two preformed lenses with one comprising a diffractive pattern, the RI match should be the same or very close, e.g., within 0.02, to hide the diffractive seal features. For example, when laminating two plastic lenses made of RI of 1.67 with a diffractive pattern, the RI of the adhesive composition can be about 1.64 to about 1.70. Even though some commercially available adhesives may exhibit a high RI, they often exhibit poor adhesion. For example, Comparative Example 1 (C1) comprises 100% of #6205 (supplied by NTT Advanced Technology Corp.) and demonstrated very poor adhesion performance. Furthermore, the C1 adhesive broke the diffractive seal and contaminated the liquid crystal inside the diffractive region.

In one embodiment, the adhesive composition is one of those listed in Table 1 of the Examples. In one embodiment, the composition comprises: about 10-15% urethane pre-polymer, about 0.2-0.4% photoinitiator (e.g., Irgacure 819), about 20-25% vinyl resin (e.g., NTT #6205), 25-35% acrylates (e.g., NK A-BPEF), about 0.01-2% of one or more stabilizers (e.g., nitrosamines). Optionally, the composition also comprises about 30-40% thiols. In a particular embodiment, the adhesive composition has the components of Example H4. In another embodiment, the adhesive composition is the formula of Example H4.

Light Source

The adhesive compositions are curable by exposure to radiation (a light source), preferably ultraviolet or ultraviolet-visible light. Curing can be conducted after the lamination process, which means the light passes through the lens assembly to reach the adhesive. In cases where the lens assembly includes a UV blocker, the light source can provide emission bands of wavelengths longer than 400 nm such as Actinic light sources or LED light sources.

The exposure time required to cure the adhesive compositions can vary and can depend on the light source, photoinitiator concentration, and the distance of the source from the substrate. One of ordinary skill in the art would readily appreciate how to adapt the exposure time accordingly.

Exemplary light sources include, but are not limited to:

Medium Pressure Vapor Lamp Source: Six-inch lamp operating at a power level of approximately 200 watt per inch. The curing chamber can include a conveyer transporting the sample underneath the lamp. The plane of the conveyer can be positioned approximately 3 inches from the lamp. The light energy can be set at approximately 1000 mJ/cm2 measured with Model ILT 390 Light Bug from International Light, Inc. over the range of 250 to 400 nm in one pass;

Actinic Light Source: Two sets of four fluorescent lamps can be positioned above and below to provide substantially uniform radiation over the plane of the curing stage. Approximately 4.9 mW/cm2 measured at the plane of sample from the top lamps and approximately 4.1 mW/cm2 from the bottom lamps with International light meter model IL1400A with XRL 140A detector. These lamps emit activating light in the range of greater than about 380 nm and are commercially available from Philips Electronics as model TLD-15W/03;

LED sources, such as a custom LED array with a main wavelength at 411±4 nm;

DYMAX BlueWave™ 50 UV Spot Light with the UV main output of about 3000+ mW/cm2 at 365 nm, 410 nm, and at 430 nm.

Devices

As previously mentioned, the adhesive compositions provided herein can be used to bond substrates, e.g., ophthalmic components. The adhesive can be applied in a number of ways readily apparent to one of ordinary skill in the art including, but not limited to, spinning, dipping, brushing, spraying, filling and ink jet printing. In one embodiment, the adhesive is applied by ink jet printing.

The adhesive compositions provided herein can also be applied by surface casting, which includes applying the adhesive composition to one preformed lens and then casting another lens on the top of the original preformed lens.

The substrates to be laminated can be the same as or different from one another. In one embodiment, the adhesive is disposed between two substrates, each with a different RI. For example, adhesive compositions were found to adhere surface casting Trivex® (RI=1.53) resin to a preformed MR-10 lens (RI=1.67). When the substrates have different RIs, the RI of the cured adhesive composition can have a RI value close to the average RI of the two lenses. For example, when laminating preformed MR-10 lens (RI=1.67) to a preformed polycarbonate lens (RI=1.58), the RI of the cured adhesive composition should be in the range of about 1.60 to about 1.65, and preferably about 1.61 to about 1.64. The advantage of having an adhesive RI close to the RI of both lenses is to reduce or eliminate light interference resulting from the difference in RI of the two lenses.

Accordingly, in another embodiment, a device is provided. The device comprises a) a first substrate, e.g., ophthalmic component, b) a second substrate, e.g., ophthalmic component, and c) a curable adhesive composition disposed between the first and second ophthalmic components. The adhesive can be any of the adhesives described herein, such as those comprising at least one urethane pre-polymer comprising a difunctional isocyanate and an allylic phenol, and a photoinitiator. The refractive index of the adhesive composition, after curing, is i) about equal to the refractive index of at least one of the first ophthalmic component and the second ophthalmic component, ii) between the refractive index of the first lens and the refractive index of the second lens, or iii) about equal to the average refractive index of the first ophthalmic component and the second ophthalmic component. In one embodiment, the refractive index of the adhesive composition, after curing, is within 0.07, 0.03, or 0.02 of the refractive index of at least one of the first ophthalmic component and the second ophthalmic component. Preferably, the refractive index is within 0.02, of the refractive index of at least one of the first ophthalmic component and the second ophthalmic component. In another embodiment, at least one of the first ophthalmic component and the second ophthalmic component has a refractive index of about 1.67±0.07.

The examples given below are merely illustrative and are not meant to be an exhaustive list of all possible embodiments, applications or modifications of the invention. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes of carrying out the invention which are obvious to those skilled in the chemical arts or in the relevant fields are intended to be within the scope of the appended claims.

EXAMPLES

Synthesis of Urethane Pre-Polymer

Several urethane pre-polymers were prepared, as follows.

Example 1

61.86 g of ortho-diallyl bisphenol A (ODABA) was warmed on a hot plate to 60-65° C. Then, while stirring, 42.98 g of 21.95 wt % m-xylene diisocyanate (DIIC) in 1-bromonaphthalene was added in less than 180 seconds to the stirring ODABA. Then the plate heater was turned off. As soon as the amount of DIIC was completed, the temperature change due to reaction exotherm was recorded. The polymerization reaction was monitored by measuring refractive index (RI). The RI was 1.6080, and the viscosity was 2100 cP.

Example 2

58.00 g of ODABPA without catalyst solution was warmed on a hot plate at 65° C. of the actual liquid temperature of the monomer while stirring. 4.11 g of m-xylene DIIC was added in less than 60 seconds to the stirring ODABA. Then the plate heater was turned off. As soon as the amount of DIIC was completed, the temperature change was recorded. The polymerization reaction was monitored by measuring refractive index (RI). The pre-polymer components were 6.62 wt % m-xylylene DIIC and 93.38 wt % ODABA. The total mass was 62.11 g. The RI was 1.5885, and the viscosity was greater than 170,000 cP.

Mixing the Components:

The amount of the solid photoinitiator to be used can be taken from pre-dissolved concentrated form in the range of 3-6% by weight. High viscosity and/or non-pourable components can be preheated and mixed with others. Solid monomers or oligomers can also be preheated and mixed with a low viscosity component before adding a predetermined amount of photoinitiator. The final composition can be mixed for at least 10 to 15 minutes away from light before storing it in a brown polypropylene bottle at regular room temperature conditions.

The adhesive composition may be formed upon mixing together premix A, which contains an acrylate and urethane pre-polymer, and premix B, which contains the thiol component that catalyzes polymerization of the acrylate, thereby causing a change in viscosity.

Sample Preparation

The components that form the light curable adhesive were used as received.

Assembly and Curing: About 0.5 g of the adhesive is placed on a first substrate, e.g., a pre-cleaned round, flat piece of uncoated MR-10 having a diameter of about 44 mm and a thickness of about 1.2 mm (supplied by PixelOptics, Inc.). A second substrate, e.g., the same as the first, is placed with a gentle contact to the adhesive on top the first piece until the adhesive spreads to the edge of the substrates. The assembly then proceeds to the curing step, e.g., it is placed on an actinic light source curing stage. The curing stage is about 5 mm thick round clear crown glass and is about 80 mm in diameter. The assembly is exposed to the light from the top and bottom for 1.5 min. The cured assembly is examined and left at room temperature for at least 10 min before the adhesion test.

Refractive Index Measurement: Abbe-3L Refractometer from Fisher Scientific was used to measure the refractive index of the adhesives in liquid state (before curing) or solid cured state. This Refractometer has an index range from 1.30 to 1.71 relative to Sodium D line (589.3 nm). 1-bromonaphthalene from Fisher Scientific was used as contact liquid for solid test pieces with indices less 1.64 nD, and Series M 1.75 nD from Cargill was used as contact liquid for solid test pieces with indices more than 1.64 nD.

Adhesion Strength: The adhesion strength was evaluated based on how much effort was needed to separate the two glued pieces. A hand-held, mold scraper tool commercially available under parts code TTAR 05-020 for the handle and TTAR 05-021 for the de-molding blade from Optical Dynamics was used to separate the two glued pieces and assign adhesion ratings as follows:

Poor: Easy to delaminate from both sample pieces by hand without using the scraper tool.

Good: The two sample pieces were difficult to delaminate using a razor blade.

Excellent: The two sample pieces do not delaminate using the scraper tool unless excessive force is applied. For this case, separation was associated with broken portions, with the cured adhesive randomly remaining on the separate pieces of the test sample.

The adhesive compositions that exhibited good RI match and good adhesion in the initial screening tests were further tested for adhesion performance and RI match in actual lens laminates to form composite lens. The adhesion performance was tested by surfacing and edging of the final lens laminate looking for any sign of delamination. All preferred adhesive compositions show good RI match and good, very good or excellent adhesion.

The invention can be further illustrated by referring to the following adhesive compositions in Table 1 below. (RI=refractive index)

The RI of the compositions before and after curing was measured at 23° C.

TABLE 1

Exemplary and Comparative High Index Adhesive Compositions (amounts in wt %)

| Component | H1 | H2 | H3 | H4 | H5 | H6 | H7 | C1 |
|---|---|---|---|---|---|---|---|---|
| Urethane pre-polymer: xylene diisocyanate orthodiallyl bisphenolA | 13.83 | 13.61 | 14.37 | 13.65 | 13.94 | 13.24 | 13.52 | |
| Photoinitiator | | | | | | | | |
| Irgacure 819 | 0.20 | 0.20 | 0.20 | 0.40 | 0.20 | 0.40 | 0.20 | 0.20 |
| Vinyl resin | | | | | | | | |
| NTT #6205 | 20.15 | 19.88 | 20.93 | 21.56 | 22.17 | 22.92 | 23.25 | 30.4 |

TABLE 1-continued

Exemplary and Comparative High Index Adhesive Compositions (amounts in wt %)

| | H1 | H2 | H3 | H4 | H5 | H6 | H7 | C1 |
|---|---|---|---|---|---|---|---|---|
| Acrylate(s) | | | | | | | | |
| NK A-BPEF | 28.74 | 28.28 | 29.85 | 28.11 | 28.70 | 27.25 | 27.78 | 42.5 |
| BX-PTEA | 2.96 | 2.79 | 0.9 | | | | | |
| Thermal Polymerization Inhibitors | | | | | | | | |
| Nitrosoamine Q-1301 | 0.10 | 0.10 | 0.06 | 0.1 | 0.1 | 0.2 | 0.2 | |
| Nitrosoamine Q-1300 | 0.01 | 0.01 | | 0.01 | 0.01 | 0.02 | 0.02 | |
| 2-Allyl phenol | | 1.0 | 1.0 | 1.0 | 1.0 | 2.0 | 2.0 | |
| 4-methoxy phenol (MEHQ) | | | 0.04 | | | | | |
| Thiol(s) | | | | | | | | |
| 1,2-bis (2-mercapto ethylthio)-3mercapto propane | 28.58 | 28.86 | 27.32 | 28.8 | 28.58 | 27.94 | 27.85 | 21.11 |
| Trimethylolpropane tris (3-mercaptopropionate) | 4.27 | 4.31 | 4.08 | 4.31 | 4.27 | 4.17 | 4.16 | 5.79 |
| Bromonaphthalene | 1.10 | 1.08 | 1.14 | 2.16 | 1.14 | 2.16 | 1.2 | |
| Initial Viscosity at 25° C. (cP) | 1253 | 1140 | 1400 | 1280 | 1370 | 1023 | 1113 | 1650 |
| Composition RI (pre-cure) | 1.6275 | 1.6263 | 1.6280 | 1.6291 | 1.6291 | 1.6294 | 1.6293 | 1.6320 |
| Composition RI (cured) | | | | 1.6588 | 1.6575 | 1.6575 | 1.6586 | 1.6654 |
| Adhesion strength | Excellent | Excellent | Excellent | Excellent | Excellent | Excellent | Excellent | Good |
| Viscosity after 5 days | 1538 | 1326 | 1635 | 1414 | 1657 | 1460 | 1569 | Gel (>30,000) |
| Stability | Stable | Stable | Stable | Stable | Stable | Stable | Stable | Not stable |

The compositions listed in the table above yield adhesives that provide a good RI match, stable viscosity at 25° C. over 5 days, clear, tough and flexible film properties, and excellent adhesion strength. Comparative example C1 lacks the urethane pre-polymer and photoinitiator, shows weaker adhesion strength, and did not maintain viscosity stability over a 5 day time period.

What is claimed is:

1. A curable adhesive composition, comprising:
   about 5 wt % to about 30 wt % of a urethane pre-polymer comprising (i) an isocyanate and (ii) an allylic phenol comprising a bisphenol A component;
   about 20 wt % to about 60 wt % of at least one acrylate;
   about 15 wt % to about 60 wt % of at least one vinyl resin; and
   a photoinitiator;
   wherein the adhesive composition has a refractive index, after curing, of greater than 1.60 at a wavelength of 589.3 nm and 25° C., and the viscosity of the adhesive increases by less than 100% over about 8 hours.

2. The composition of claim 1, wherein the viscosity of the adhesive increases by less than 100% over about 24 hours.

3. The composition of claim 1, wherein the isocyanate is m-xylene diisocyanate.

4. The composition of claim 1, wherein the allylic phenol is diallylether bisphenol A or ortho-diallyl bisphenol A.

5. The composition of claim 1, wherein the urethane pre-polymer comprises xylene diisocyanate and ortho-diallyl bisphenol A.

6. The composition of claim 1, wherein the adhesive composition, after curing, has a refractive index of about 1.60 to about 1.74.

7. The composition of claim 1, wherein the adhesive composition comprises:
   about 0.01 wt % to about 5 wt % of at least one photoinitiator.

8. The composition of claim 1, further comprising a stabilizer.

9. The composition of claim 8, wherein the stabilizer is a nitrosamine.

10. The composition of claim 1, further comprising a thiol component.

11. The composition of claim 10, wherein the thiol component is 1,2-bis(2-mercapto ethylthio)-3-mercapto propane or trimethylolpropane tris(3-mercaptopropionate).

12. The composition of claim 1, wherein the adhesive composition comprises about 20 wt % to about 25 wt % of at least one vinyl resin.

13. The composition of claim 1, further comprising at least one naphthalene component.

14. The composition of claim 13, wherein the naphthalene component is 1-bromo naphthalene.

15. The composition of claim 1, wherein the adhesive composition is curable by ultraviolet radiation.

* * * * *